United States Patent [19]

Ott

[11] Patent Number: 4,796,756
[45] Date of Patent: Jan. 10, 1989

[54] OPTICAL LENS CARRIER

[75] Inventor: William M. Ott, St. Petersburg, Fla.

[73] Assignee: Silor Optical of Florida, Inc., St. Petersburg, Fla.

[21] Appl. No.: 180,225

[22] Filed: Apr. 11, 1988

[51] Int. Cl.⁴ .......................................... B65D 85/48
[52] U.S. Cl. .................................... 206/454; 206/316; 206/445; 206/448; 206/449; 206/564; 350/252
[58] Field of Search ................... 206/5, 454, 303, 316, 206/445, 448, 449, 486, 490, 562, 563, 564, 526; 350/252, 254, 257; 211/41

[56] References Cited

U.S. PATENT DOCUMENTS

| | | | |
|---|---|---|---|
| 593,024 | 11/1897 | Kinsey | 206/5 |
| 1,258,621 | 3/1918 | Jenkins | 206/316 |
| 3,306,462 | 2/1967 | Cruz | 206/564 |
| 3,372,812 | 3/1968 | Parcels | 206/445 |
| 3,469,686 | 9/1969 | Gutsche et al. | 206/564 |
| 3,740,238 | 1/1971 | Graham | 206/445 |
| 3,850,296 | 11/1974 | Hirata et al. | 206/454 |
| 4,129,211 | 12/1978 | Clement et al. | 206/583 |
| 4,494,667 | 1/1985 | Griffith | 206/564 |
| 4,705,169 | 11/1987 | Mastronardo | 206/564 |
| 4,705,170 | 11/1987 | Creaden | 206/585 |
| 4,707,247 | 11/1987 | Savoy | 206/564 |
| 4,767,002 | 8/1988 | Malcolm | 206/564 |

FOREIGN PATENT DOCUMENTS 757055 10/1933 France ................................ 350/252
228704 2/1925 United Kingdom ................ 350/252

Primary Examiner—David T. Fidei
Attorney, Agent, or Firm—Henry R. Lerner

[57] ABSTRACT

A lens-carrying device is adapted to receive and contain a plurality of optical lenses in side-by-side non-contacting relation. The device is constructed of a first tray and a second tray, adapted to be releasably engaged, with either tray serving as the base or cover of the device. Each tray contains at least one row of longitudinally-spaced side-by-side annular cavities. When the trays are engaged with each other, the annular cavities of each tray are juxtaposed in mirror relation to each other to form a plurality of side-by-side lens-carrying annular chambers for receiving and supporting optical lenses therein. Each chamber has a central peripheral slot for receiving and holding a lens having a thickness up to a first predetermined value, lateral step members adjacent the central peripheral slot for supporting above the central slot a lens having a thickness greater than the first predetermined value and up to a maximum predetermined value, and divider ribs adjacent the lateral step members for interconnecting adjacent chambers but preventing lenses in adjacent chambers from contacting each other. A large number of optical lenses of varying lens powers can thus be transported in a single lens carrier while preventing any damage to the center area of any of the optical lenses.

13 Claims, 5 Drawing Sheets

OPTICAL LENS CARRIER

BACKGROUND OF THE INVENTION

The present invention relates to an optical lens carrier, and more particularly to a carrier for retaining a plurality of optical lenses in non-contacting spaced relation to facilitate transportation of the lenses without damage.

In the manufacture of optical lenses, there is often the need to transport the lenses in bulk from one location to another. For example, lenses initially manufactured at one facility are frequently transported great distances by truck, rail, or air to another facility, where the lenses are coated. Transportation of the lenses in bulk quantity often results in damage to or scratching of the center area of the lenses, either through contact of the lenses with each other, rubbing of the lenses against each other, or contact of the center area of the lenses with the container in which they are transported.

Quite obviously, scratching of the center area of an optical lens destroys the utility of the lens. Accordingly, the need exists for a means of transporting a plurality of optical lenses in bulk over great distances while insuring that the lenses will not be damaged or scratched in transit.

SUMMARY OF THE INVENTION

An object of the present invention is to provide a means for transporting a plurality of optical lenses in bulk which is convenient, economical and prevents damage to the center area of any of the lenses.

A further object of the present invention is to provide a means for transporting a plurality of optical lenses in bulk which can accommodate optical lenses having a variety of lens powers covering a wide range.

These and other objects are achieved in accordance with the present invention by a lens carrying device adapted to carry and support a plurality of optical lenses therein in non-contacting relation comprising a first tray having a plurality of longitudinally-spaced side-by-side cavities and a second tray having a plurality of longitudinally-spaced side-by-side cavities, the first and second trays being releasably engagable such that the plurality of first tray cavities and plurality of second tray cavities are juxtaposed in mirror-reflection relation opposite one another to define a plurality of side-by-side lens-carrying chambers for receiving and supporting a plurality of optical lenses in side-by-side non-contacting relation.

In accordance with the invention, each of the chambers defined by the above-mentioned sets of juxtaposed first and second tray cavities is adapted to receive a lens having a thickness falling anywhere within a predetermined range of thicknesses. To this end, each set of first and second tray cavities together defines an annular chamber having a central peripheral slot for supporting on its peripheral edge a lens having a thickness up to a first predetermined value bounded on either side by adjacent lateral peripheral ledges or ridges which together define a step member for supporting on edge above the central slot a lens having a thickness greater than the above-mentioned first predetermined value and up to a maximum predetermined value.

Further in accordance with the invention, the step members of adjacent lens chambers are separated by a divider means for isolating a lens within a chamber and preventing lenses in adjacent chambers from contacting one another. Additionally, the divider means prevents the center area of each lens from contacting any portion of the lens carrying device itself. The only portion of a lens which contacts the lens carrying device is the outer annular edge of each lens, which during manufacture is cut away or bevelled to match a particular eyeglass frame dimension and engage a particular eyeglass frame. Accordingly, contact of this outer annular edge of the lens with the lens carrying device does not affect the performance of the lens.

In a preferred aspect of the present invention, the central peripheral slot of each annular chamber is constructed of first and second slot portions, located respectively in the first and second cavities of the chamber. The first slot portion of the central slot is adapted to receive a lens on edge having a thickness up to a first predetermined value when the first tray is used as the base tray of the device. The second slot portion of the central slot is adapted to receive a lens on edge having a thickness greater than the above-mentioned first predetermined value and up to a second predetermined value when the second tray is used as the base tray of the device. Finally, the step member adjacent the central slot is adapted to support a lens on edge having a thickness greater than the above-mentioned first and second predetermined values and up to a third predetermined value regardless of whether the first tray or second tray is used as the base tray of the device. Accordingly, the lens carrying device can accommodate a wide range of lens powers depending on the lens powers of the lenses which need to be transported.

BRIEF DESCRIPTION OF THE DRAWINGS

The invention will be described by reference to the accompanying drawings, in which.

DETAILED DESCRIPTION OF THE PREFERRED EMBODIMENTS

Figure 1:
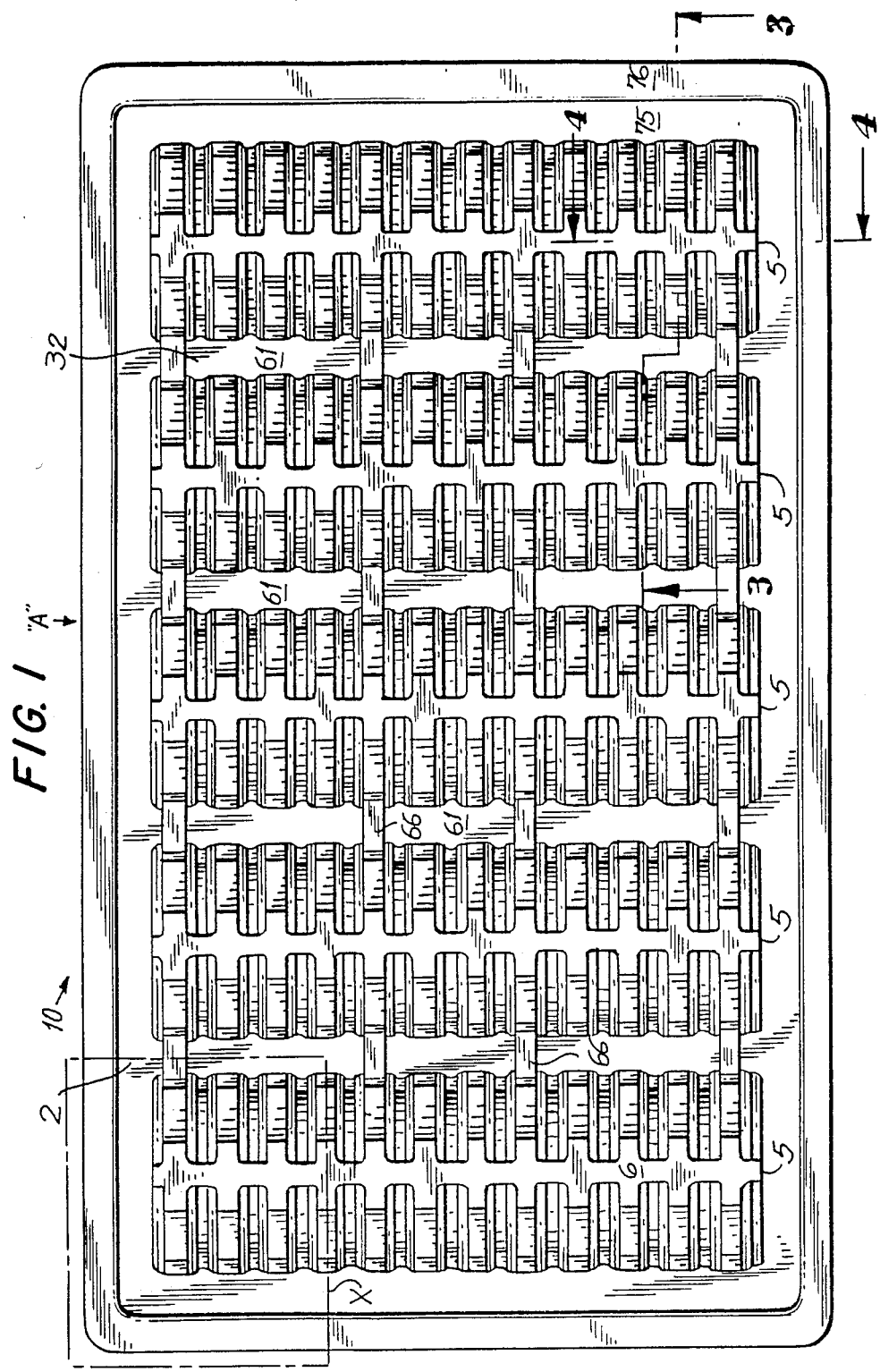
FIG. 1 is a top plan view of one embodiment of the lens carrying device of the present invention.

As shown in the drawings, the lens carrying device of the present invention, designated generally as 10, comprises a rigid first tray 1 and a rigid second tray 2, each of which, as will be described more fully hereinafter, can serve as either the cover or base tray of the device. Rigid trays 1 and 2 can each be molded as a single integral piece by conventional plastic molding techniques from a suitable plastic such as 80 mil styrene.

Rigid tray 1 includes five rows 3, with each row having twelve longitudinally-spaced side-by-side cavities, generally designated as 4, which are arranged parallel to each other along the length of each row 3. Tray 1 can thus be seen to contain a total of 60 cavities 4, each cavity being adapted to seat an optical lens, as will be explained more fully below.

Similarly, rigid tray 2 includes five rows 5 of twelve longitudinally-spaced side-by-side cavities, generally designated as 6, which are arranged parallel to each other along the length of each row 5, such that tray 2 is adapted to accommodate up to 60 optical lenses.

When trays 1 and 2 are engaged with each other cavities 4 and 6 are juxtaposed in substantial mirror-reflection relation, with each set of juxtaposed cavities 4 and 6 defining an annular chamber within the lens carrying device for retaining therein an optical lens having a thickness within a predetermined range of thicknesses.

Figure 2:
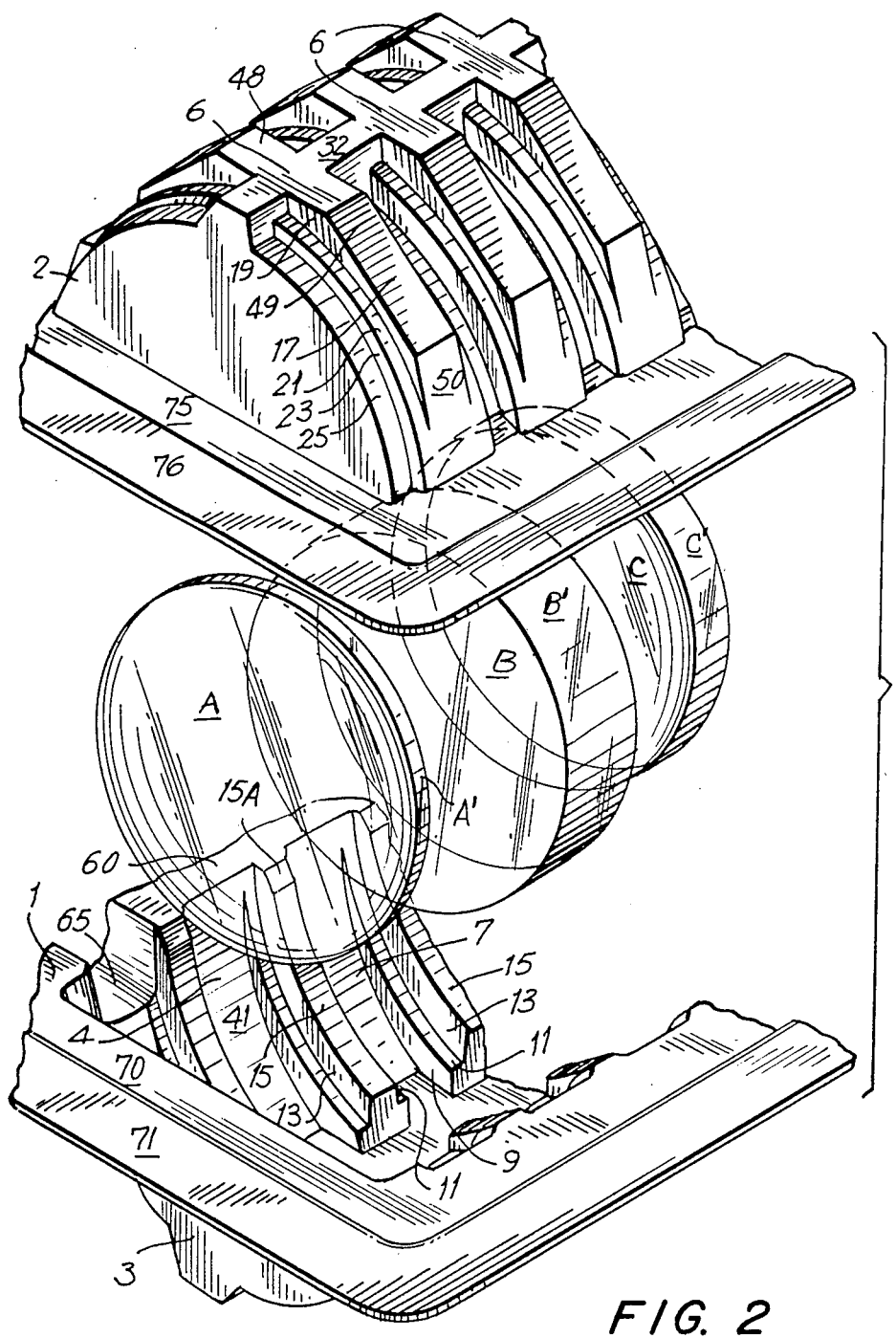
FIG. 2 is an exploded perspective view, on an enlarged scale, of corner portion "X" of the lens carrying device shown in FIG. 1, with the trays of the device in separated condition.
Figure 6:
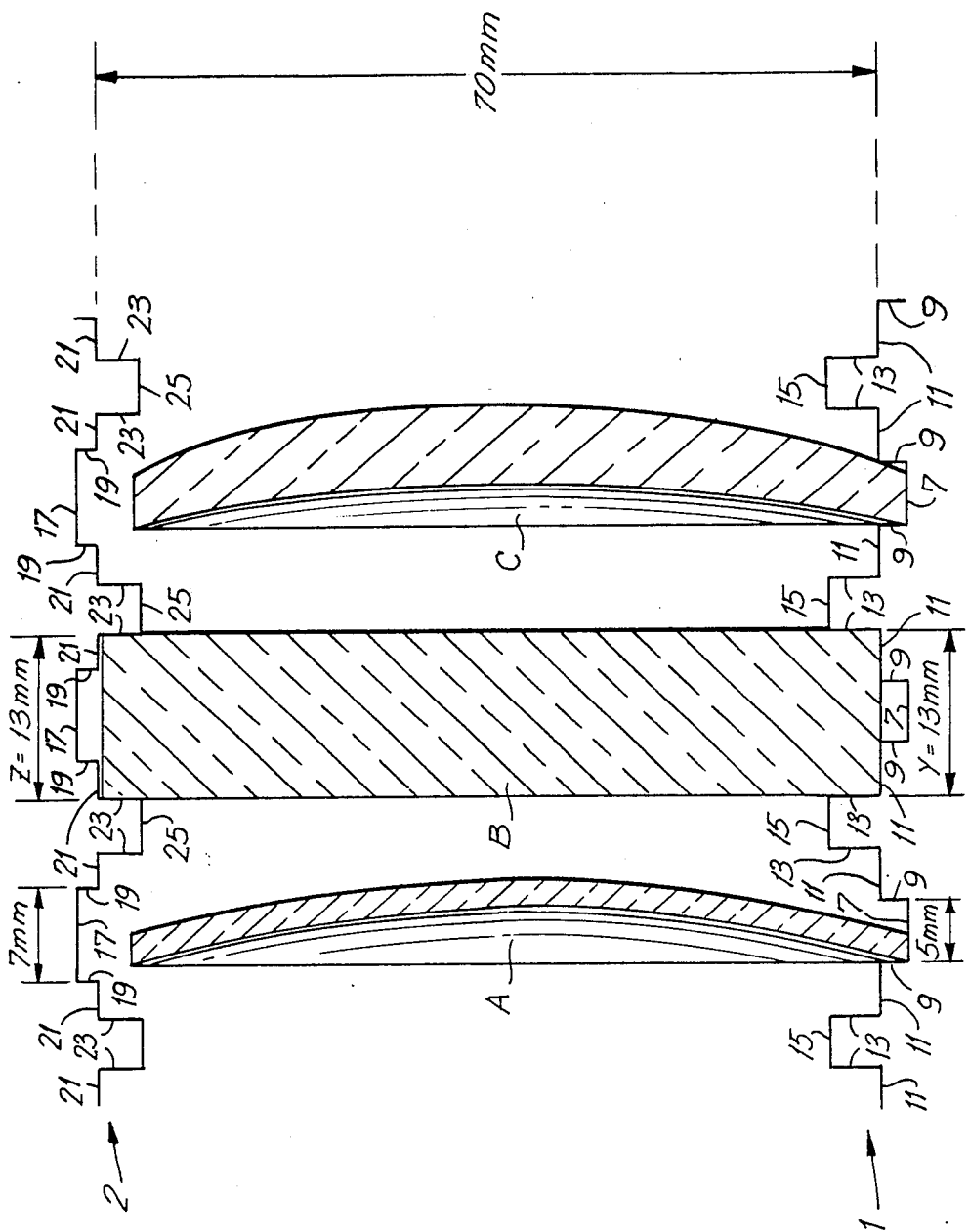
FIG. 6 is a schematic representation of the arrangement shown in FIG. 4.

As can be seen most clearly from FIG. 2 and from the schematic representation of FIG. 6, each cavity 4 includes a central peripheral curved slot defined by base surface 7 and wall portions 9 adjacent either side of base surface; a curved step member defined by lateral surfaces 11 adjacent wall portions 9; and curved divider ribs defined by rib wall portions 13 adjacent lateral surfaces 11 and a lateral rib surface 15. Lateral rib surface 15 interconnects the divider rib wall portions 13 of adjacent cavities 4.

Cavities 6 are constructed in a similar fashion to cavities 4. Thus, each cavity 6 includes a central peripheral curved slot defined by base surface 17 and wall portions 19 adjacent either side of base surface 17; a curved step member defined by lateral surfaces 21 adjacent wall portions 19; and curved divider ribs defined by rib wall portions 23 adjacent lateral surfaces 21 and a lateral rib surface 25 which interconnects divider rib wall portions 23 of adjacent cavities 6.

When tray 1 and 2 are engaged, the following elements of cavities 4 and 6 are juxtaposed opposite each other in substantial mirror-reflection relation to define an annular chamber for containing an optical lens such as lenses A, B and C shown in FIG. 2 on edge, base surfaces 7 and 17; wall portions 9 and 19; lateral surfaces 11 and 21; rib wall portions 13 and 23; and lateral rib surfaces 15 and 25.

As used in the present specification, the term "on edge", in regard to optical lenses, means on a peripheral annular edge of the optical lens, such as edges A', B' and C' of lenses A, B and C shown in FIG. 2.

Accordingly, the lens carrying device of the present invention includes a plurality of multi-step annular chambers. The multi-step configuration of each chamber, provided by the curved central peripheral slots and step members of engaged cavities 4 and 6, allows for the placement of any of a variety of optical lenses in each chamber in a secure manner. Moreover, the curved divider ribs interconnecting adjacent chambers not only separate adjacent chambers, but also prevent contact of lenses in adjacent chambers and leave the central area of a secured lens free from contact with the lens carrying device itself.

For example, in accordance with the preferred embodiments as seen most clearly in schematic FIG. 6, the base surface 7 of each cavity 4 has a width of 5 mm and the base surface 17 of each cavity 6 has a width of 7 mm, the distance "Y" between divider rib wall portions 13 is 13 mm, the distance "Z" between divider rib wall portions 23 is 13 mm, and the curved step member formed in part by juxtaposed curved lateral surfaces 11 and 21 has a diameter of substantially 70 mm. This configuration, as best illustrated in schematic FIG. 6 permits the accommodation of a wide range of 70 mm lens powers in a single carrier device.

More specifically, lenses such as lens A and C having a thickness up to about 5 mm can be seated in the central peripheral slots formed by base surface 7 and wall portions 9 of tray 1. Although the uppermost peripheral edges of lenses A and C do not extend up into the peripheral slots formed by base surface 17 and wall portions 19 of tray 2, lenses A and C are prevented from contacting an adjacent lens by wall portions 23 and rib surface 25 of the divider means of tray 2. Conversely, tray 2 can be used as the base tray and lenses up to 7 mm in thickness can be seated in the central slots formed by base surface 17 and wall portions 19 of tray 2. In either of the above cases, lenses B having a thickness up to about 13 mm can be seated within the configuration formed by lateral surfaces 11 and 21 and wall portions 13 and 23.

It will thus be seen that tray 1 can be used as the base tray and 60 lenses of varying thicknesses up to 5 mm can be retained in the central slots of cavity 4 for transportation. Similarly, tray 2 can be used as the base tray and 60 lenses of varying thickness up to 7 mm can be retained in the central slots of cavity 6 and transported. Alternatively, 60 lenses of varying thickness greater than 5 mm and up to 13 mm can be retained between the step members formed by lateral surfaces 11 and 21 and transported using tray 1 as the base tray. Conversely, 60 lenses of varying thickness greater than 7 mm and up to 13 mm can be retained between the step members formed by lateral surfaces 11 and 21 and transported using tray 2 as the base tray. 5 mm or 7 mm lenses can also be mixed and transported with lenses having thicknesses, respectively, greater than 5 or 7 mm and up to 13 mm, as shown in FIG. 6. The carrier thus provides great flexibility in meeting the varying needs of a manufacturer in transporting different size lenses.

It is preferred that the semi-annular cavities 4 and 6 of each row of cavities be segmented, respectively, by support channels 31 and 32, which completely traverse the length of a row of cavities and provide a base for either tray 1 or tray 2 to rest on a horizontal surface, depending on which tray is selected as the base tray and which tray is selected as the cover tray for a particular group of lenses.

Figures 3, 4:
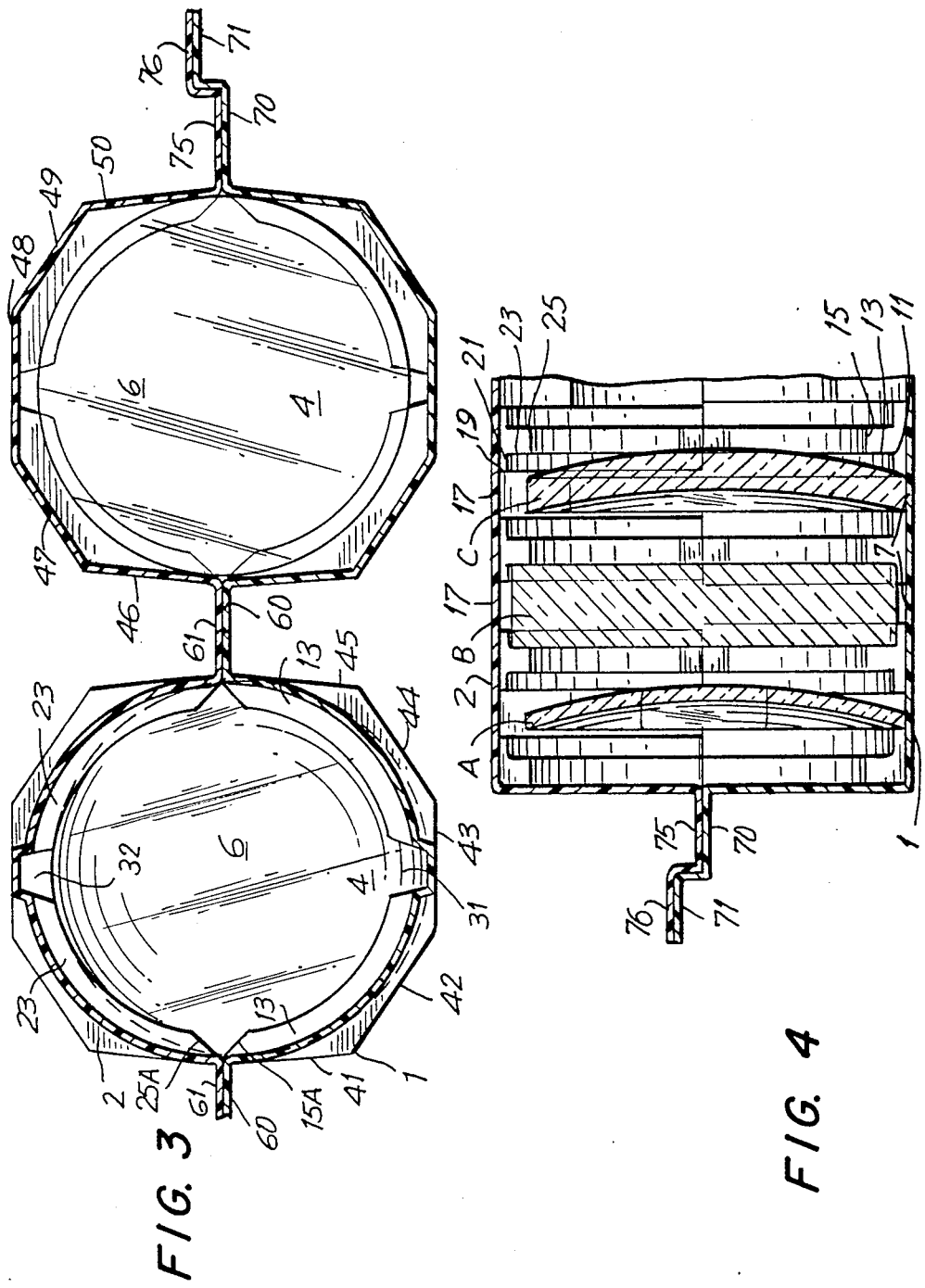
FIG. 3 is a cross-sectional view taken along the line 3—3 of FIG. 1.
FIG. 4. is a cross-sectional view taken along the line 4—4 of FIG. 1 illustrating three different optical lenses seated in three side-by-side chambers within the lens carrying device of FIG. 1.
Figure 5:
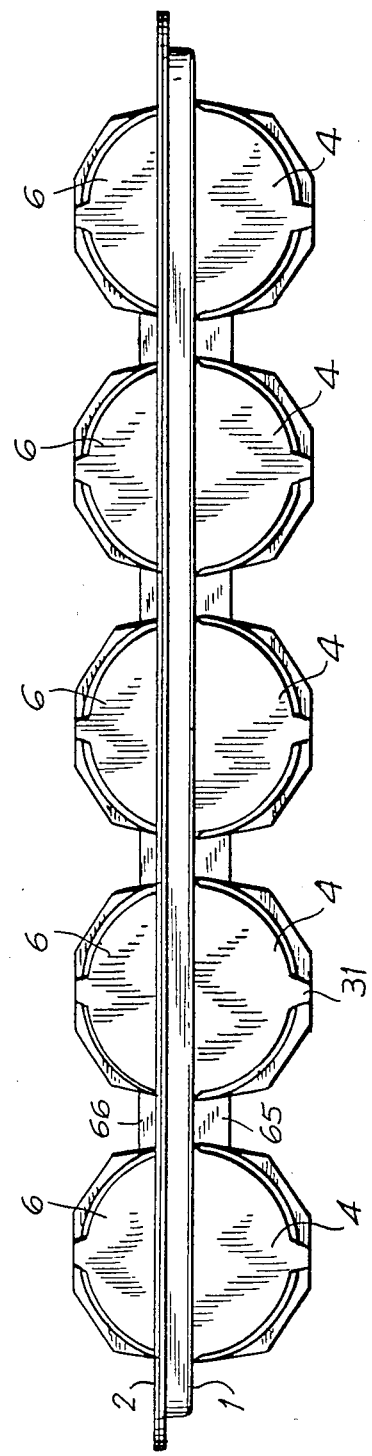
FIG. 5 is a side elevational view of the lens carrying device shown in FIG. 1 taken in the direction of the arrow "A" of FIG. 1.

Moreover, as shown in FIG. 3, it is preferred that base surfaces 7 and 17 of each cavity 4 and 6 be constructed respectively of five flat surfaces 41, 42, 43, 44, 45 and 46, 47, 48, 49, 50, each group of which together define a semi-decagonal semi-annular slot portion. Although the base surfaces 7 and 17 of cavities 4 and 6 can each be constructed as a single continuous curved surface, the semi-decagonal shape is preferred since it minimizes rotation of a lens within the chamber formed by cavities 4 and 6. Moreover, the bottom surfaces 43 together additionally provide horizontal crosspieces for base support channels 31 when tray 1 is used as the base tray, as do the bottom surfaces 48 for base support channels 32 when tray 2 is used as the base tray.

It is preferred that the step members and divider rib means of each cavity be smoothly curved, with rib surfaces 15 and 25 having, respectively, bevelled edges 15A and 25A.

Rows of cavities 4 and 6 are separated from like rows, respectively, by transverse dividers 60 and 61, which are constructed as flat molded surfaces running parallel to and traversing the length of each row of cavities.

Each row divider 60 and 61 contains, respectively, four notches 65 and 66 therein.

The lens carrying device of the present invention also includes means for releasably engaging trays 1 and 2. Such means for releasably engaging the trays, in the embodiment shown in the drawings, includes inwardly-extending lip 70 and raised border or rim 71 integrally formed around the periphery of tray 1 and outwardly-extending lip 75 and depressed border or rim 76 integrally formed around the periphery of tray 2.

To engage trays 1 and 2, lip 70 and rim 71 are snap-fitted into engagement with lip 75 and rim 76. The trays are engaged, but can be released from engagement by pulling apart rims 71 and 76, which releases the snap-fitting of inner lips 71 and 75 to disengage the trays. When trays 1 and 2 are engaged, transverse dividers 60 and 61 abut against each other, thus isolating the rows of chambers from each other.

When using the lens-carrying device of the present invention, either tray 1 or tray 2 is selected as the base tray and placed on a horizontal work surface. A plurality of optical lenses are then inserted into the cavities 4 or 6 of the selected base tray 1 or 2. Depending on the thickness of a given lens, it is seated upright and supported on edge either in the central peripheral slot of a cavity in the base tray or on the lateral step means of the cavity adjacent the central peripheral slot. The lenses extend upwardly beyond the uppermost surface of the base tray. Once the base tray is filled, the remaining tray, serving as the cover tray, is placed over and engaged with the base tray, the releasable engagement means engaging the trays in a releasably detachable manner. Once the cover and base trays are engaged, the lenses are thereby covered, each lens is captured and fully contained on edge within an annular chamber formed by juxtaposed tray cavities, and isolated from each other.

As can be seen schematically in FIG. 6, the lenses held in the base tray do not extend up into the central peripheral slot of the cover tray, even if thin enough. Thicker lenses will be securely retained between the opposite lateral surfaces 11 and 21 of the first and second tray cavities 4 and 6. Thinner lenses, however, which are engaged in the central slot of the base tray, because they do not extend into the slot portion of the cover tray, may rattle back and forth slightly in the chamber during transport. However, the divider ribs, comprised of wall portions 13 and 23 and lateral rib surfaces 15 and 25, prevent all lenses, thick or thin, from contacting lenses in adjacent trays. Moreover, the central area of each lens cannot contact any portion of the lens carrying device itself. The only portion of a lens which contacts the carrier in any way is the outer annular edge of the lens, e.g., edges A', B' and C' of lenses A, B, C, which are roughly manufactured for engagement with an eyeglass frame, and do not require the precautions against scratching necessary for the central area of the lenses.

Accordingly, the present invention provides a reusable optical lens carrier which provides for the bulk transportation of a large quantity of diverse thickness lenses while eliminating the risk of damage to the critical central area of any of the lenses, thus eliminating the potential for damaging the lenses during transportation, for example, between manufacturing facilities or other locations.

Although the exemplified embodiment consists of five rows of twelve lens chambers each, the number of rows and the number of chambers within each row may be varied from device to device as desired, bearing in mind that the preferred goal is to transport a substantial and maximum number of optical lenses in a single carrier at once.

It will be understood that the specification and preferred embodiments are illustrative but not limitative of the present invention. Other embodiments within the spirit and scope of the invention will suggest themselves to those skilled in the art.

Having thus described my invention, what I claim and desire to secure by letters patent is:

1. A lens-carrying device adapted to receive and retain a plurality of optical lenses having a predetermined range of thicknesses in a spaced-apart non-contacting relations, comprising
   a first tray having a plurality of longitudinally-spaced side-by-side cavities;
   a second tray having a plurality of longitudinally-spaced side-by-side cavities;
   said first and second trays being releasably engagable such that the plurality of first tray cavities and plurality of second tray cavities are juxtaposed in mirror relation opposite each other to define a plurality of side-by-side lens-carrying chambers for receiving and retaining a plurality of optical lenses in side-by-side non-contacting relation;
   each of said chambers having a central peripheral slot for supporting on edge an optical lens having a thickness up to a first predetermined value, lateral step means adjacent said central peripheral slot for supporting on edge above said central peripheral slot an optical lens having a thickness greater than said first predetermined value and up to a maximum predetermined value and divider means adjacent said lateral means for preventing contact between lenses in adjacent chambers.

2. A lens-carrying device as in claim 1, wherein said chambers are annular.

3. A lens-carrying device as in claim 1, wherein said central peripheral slot comprises a slot portion in said first cavity having a thickness corresponding to said first predetermined value and a slot portion in said second cavity having a thickness corresponding to a second predetermined value greater than said first predetermined value but less than said maximum predetermined value, whereby said first tray can be used as a base to support on edge lenses having thicknesses up to said first predetermined value, said second tray can be used as a base to support on edge lenses having thicknesses up to said second predetermined value and said lateral step means can be used to support on edge lenses having thicknesses greater than said first predetermined value or said second predetermined value and up to said maximum predetermined value.

4. A lens-carrying device as in claim 3, wherein said first predetermined value is 5 mm, said second predetermined value is 7 mm and said maximum predetermined value is 13 mm.

5. A lens-carrying device as in claim 2, wherein said lens-carrying annular chamber has a diameter of 70 mm.

6. A lens-carrying device as in claim 1, further comprising a plurality of rows of said longitudinally-spaced side-by-side first tray cavities and a plurality of rows of said longitudinally-spaced side-by-side second tray cavities, whereby said first and second trays are releasably engagable to define a plurality of rows of said side-by-side lens-carrying chambers.

7. A lens-carrying device as in claim 1, wherein said divider means comprises an annular rib interconnecting the lateral step means of adjacent chambers.

8. A lens-carrying device as in claim 1, wherein said central peripheral slot comprises a central base surface and wall portions adjacent said central base surface, said wall portions interconnecting said central base surface and said lateral step means.

9. A lens-carrying device as in claim 8, wherein said central base surface comprises a plurality of flat base surfaces interconnected to form a semi-decagonal surface.

10. A lens-carrying device as in claim 8, wherein said lateral step means comprises a smoothly-curved lateral surface.

11. A lens-carrying device as in claim 8, wherein said divider means comprises a wall portion adjacent said lateral step means and a lateral rib surface interconnecting the divider means wall portion of adjacent chambers.

12. A lens-carrying device as in claim 11, wherein said lateral rib surface is smoothly-curved.

13. A lens-carrying device as in claim 6, further comprising first tray divider means for separating adjacent rows of first tray cavities and second tray divider means for separating adjacent rows of second tray cavities.

* * * * *